J. B. ENTZ.
DRIVING MECHANISM.
APPLICATION FILED AUG. 21, 1914.
1,282,786.
Patented Oct. 29, 1918.
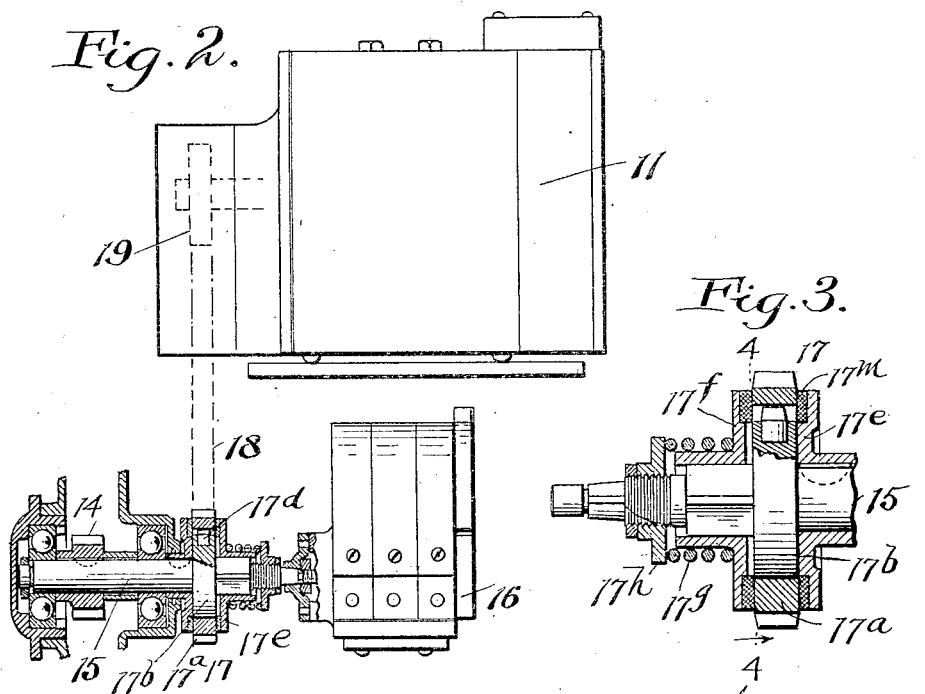
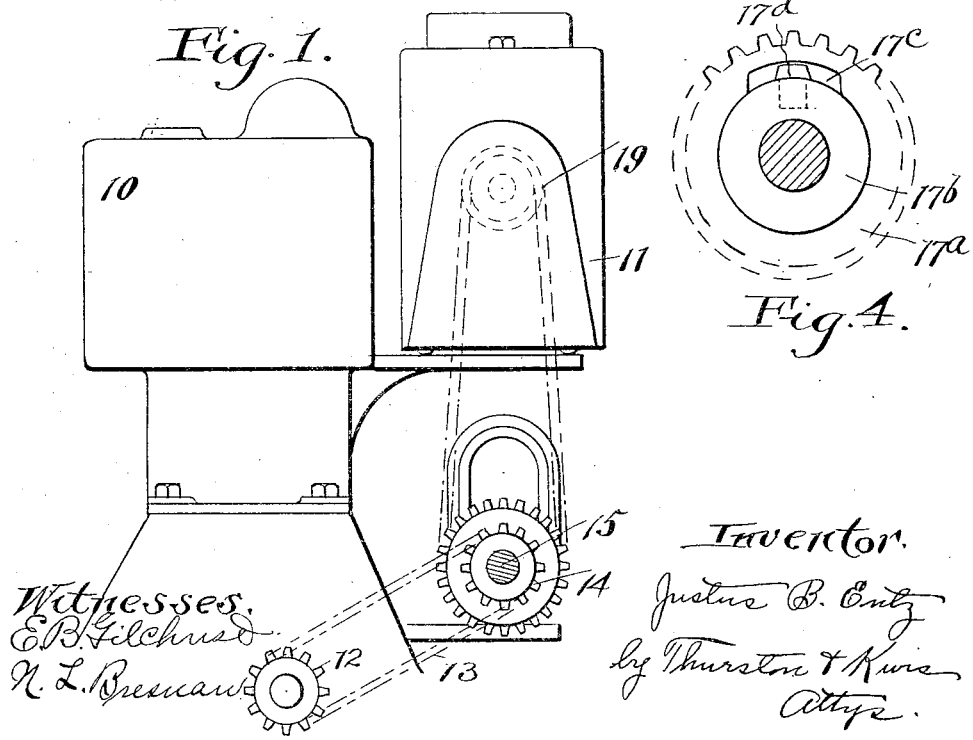

UNITED STATES PATENT OFFICE.

JUSTUS B. ENTZ, OF CLEVELAND, OHIO, ASSIGNOR TO EDWIN L. THURSTON, TRUSTEE, OF CLEVELAND, OHIO.

DRIVING MECHANISM.

1,282,786.   Specification of Letters Patent.   Patented Oct. 29, 1918.

Application filed August 21, 1914. Serial No. 857,985.

*To all whom it may concern:*

Be it known that I, JUSTUS B. ENTZ, a citizen of the United States, residing at Cleveland, in the county of Cuyahoga and State of Ohio, have invented a certain new and useful Improvement in Driving Mechanism, of which the following is a full, clear, and exact description.

This invention relates to the driving mechanism between a driven element, such as a dynamo electric machine and a variable speed source of power, such as an internal combustion engine, and has special utility in the driving or power transmitting mechanism for a dynamo electric machine which is provided on a motor vehicle to serve as a lighting and battery charging generator, or both as a generator and starting motor.

In a motor vehicle having a dynamo electric machine, which is geared or connected to the engine, the driving gearing is liable to give rise to considerable noise as the speed of the engine is varied. This is particularly true when a chain drive is utilized, and when the rotating armature possesses considerable momentum, and it is due to the fact that when the speed of the engine is decreased, the armature tends momentarily to run ahead of the engine with the result that the pull is first on one side of the chain and then on the other, causing the whipping and snapping of the chain.

The object of the present invention is to overcome the disadvantage or difficulty above mentioned, and it contemplates the use at some point in the driving mechanism between the engine and the dynamo electric machine of two adjacent coöperating driving elements which are capable of yielding relatively a limited amount so as to relieve the chain of the more or less sudden shocks and to dampen the surging which would otherwise take place when the speed of the drive is varied.

In the preferred embodiment of my invention employed in the chain drive for a dynamo electric machine, which serves both as a starting motor and as a lighting generator, I form one of the sprockets of two concentric elements, one of which is provided with a slot forming a pair of spaced shoulders or abutments, and the other having a member projecting into the space between the shoulders. Additionally, there is provided means for frictionally engaging with suitable pressure one of these elements to yieldingly resist or retard the relative movement between the elements. With this mechanism, each element is capable of positively driving the other, while at the same time the frictionally retarded relative movement may take place between the two parts of the sprocket wheel, so as to sufficiently check or dampen the shocks to provide quiet drive.

My invention may be further briefly summarized as consisting in certain novel details of construction and combinations and arrangements of parts which will be described in the specification and set forth in the appended claims.

In the accompanying sheet of drawings wherein I have shown the preferred embodiment of my invention, Figure 1 is an end view of a portion of the engine of a motor vehicle showing the dynamo electric machine and the driving mechanism between the two; Fig. 2 is a side view of the dynamo electric machine showing the major portion of the driving mechanism, parts being in section; Fig. 3 is a sectional view of a portion of the driving mechanism on an enlarged scale; and Fig. 4 is a transverse sectional view of the same substantially along the line 4—4 of Fig. 3.

Referring now to the drawings, 10 represents the internal combustion engine which may be supported on the vehicle in the usual manner, the vehicle itself not being shown as the same constitutes no direct part of the invention. Adjacent the engine is the dynamo electric machine 11 which may be utilized as a starting motor, and as a lighting and battery charging generator after the engine is started. The dynamo electric machine 11 may be of any suitable construction.

Power transmitting or driving means between the engine and dynamo electric machine, in this case, includes two sets of chain and sprocket gears which constitute one complete power transmitting agency through which the dynamo electric machine may start the engine, and may thence be driven as a generator by the engine. This power transmitting agency includes a sprocket wheel 12 on the forward end of the crank shaft, a sprocket chain 13 connecting the sprocket wheel 12 to a sprocket wheel 14 on a shaft 15 (which in this instance is adapted to drive a magneto 16), a second sprocket wheel 17 on the shaft 15, and a chain 18 which connects the sprocket wheel 17 to the sprocket wheel 19 on the end of the armature shaft of the dynamo electric machine 11. While the above described driving mechanism is used by me in practice, it is not at all essential that this mechanism be of the form or arrangement shown, as the intermediate shaft 15 need not be employed, but the machine 11 may be connected direct to the engine crank shaft.

Referring now particularly to the Figs. 3 and 4, it will be seen that the sprocket wheel 17, in which the improvement is directly applied, includes an outer toothed member 17$^a$ and a concentric inner member 17$^b$ on which the outer member is mounted. The outer member is provided on its inner periphery with an arc-shaped slot or notch 17$^c$ into which projects the end of a pin 17$^d$, which extends radially from the periphery of the inner member 17$^b$, so that the inner and outer members may have a limited range of relative movement equivalent to the length of the slot 17$^c$. The ends of this slot constitute shoulders or abutments, which are adapted to be engaged by the pin.

Relative movement between these parts is retarded by means frictionally engaging the outer member 17$^a$, and this consists of two friction plates or disks, one disk 17$^e$ being on one side of the sprocket and connected to the shaft 15, and the other 17$^f$ being located on the opposite side of the sprocket and pressed yieldingly toward the sprocket by a spring 17$^g$, which bears against an adjustable nut 17$^h$, as well as against the disk 17$^f$. The disks 17$^e$ and 17$^f$ are provided with suitable friction material 17$^m$, which bears against the sides of the outer member 17$^a$.

This device acts in substantially the following manner:—

When the motor starts to turn over the engine to crank the same, the sprocket member 17$^a$ will slip between the retarding friction members until the shoulder at one end of the slot 17$^c$ engages the end of the pin 17$^d$ whereupon the engine crank shaft is positively rotated. As soon as the engine is started, it drives the dynamo electric machine as a generator whereupon the inner member 17$^b$ which is now driven by the engine may slip until the pin 17$^d$ comes up against the shoulder at the opposite end of the slot 17$^c$, whereupon the machine 11 is positively driven.

When the speed of the engine is decreased by closing the throttle, and in the event that the momentum of the armature of the machine 11 is sufficiently great that the machine tends momentarily to run ahead of the engine, the outer sprocket wheel 17$^a$ will move forward slightly relative to the inner sprocket member 17$^b$, after which the inner sprocket member 17$^b$ again moves forwardly slightly to its normal position relative to the outer member. As the speed of the engine is increased and decreased, these two members move relatively back and forth, the degree of movement being sufficient to avoid the whipping and snapping of the chain, and the resulting noise which would take place if this yielding action were not present. It will be understood that the amount of movement under any particular circumstances, i. e. suddenness of change of speed, weight of the armature, etc., may be varied by adjusting the nut 17$^a$, which will vary the degree of pressure of the friction members on the outer sprocket member 17$^a$.

Having thus described my invention, what I claim is:—

1. The combination with a variable speed source of power, of a driven member, a power transmitting means between said source of power and the driven member, including a driven element having a pair of relatively movable adjacent elements one of which is operatively connected with the said driven member, said adjacent elements frictionally engaging each other for the purpose of retarding relative movement, one of said elements having means for positively driving the other.

2. The combination with a shaft, of a power element including a pair of relatively movable adjacent elements one of which is connected to the shaft, said adjacent elements frictionally engaging each other for the purpose of retarding relative movement, one of said elements having means for positively driving the other.

3. In combination with an internal combustion engine, a dynamo electric machine, power transmitting mechanism between the same, and including two adjacent elements, having a limited range of relative movement, and one adapted to positively drive the other, and friction means engaging one of said elements to restrict the movement thereof relative to the other.

4. In combination with an internal combustion engine, a dynamo electric machine, power transmitting means between the same, and including two adjacent elements, one having a slot, and the other a driving member projecting into the slot, and capable of movement therein from one end of the slot to the other, and means engaging one of said elements to retard the movement thereof relative to the other.

5. In combination with an internal combustion engine, a starting and lighting dynamo electric machine, power transmitting means connecting the engine and dynamo electric machine, and including a sprocket wheel having two concentric members, one having bearing on the other, one of said elements having an arc-shaped slot, and the other having a projection extending into the said slot, and capable of movement therein from one end of the slot to the other, friction means engaging one of said elements to retard the relative movement between said elements, and means by which the frictional pressure may be adjusted.

In testimony whereof, I hereunto affix my signature in the presence of a witness.

JUSTUS B. ENTZ.

Witness:
A. F. KWIS.